United States Patent
Zhao et al.

(10) Patent No.: US 8,244,894 B1
(45) Date of Patent: Aug. 14, 2012

(54) DETACH MECHANISMS FOR HOST-BASED MOBILITY PROTOCOLS

(75) Inventors: Fan Zhao, San Jose, CA (US); Stefano Faccin, Hayward, CA (US); Ameya Damle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 137 days.

(21) Appl. No.: 12/479,549

(22) Filed: Jun. 5, 2009

Related U.S. Application Data (60) Provisional application No. 61/059,106, filed on Jun. 5, 2008.

(51) Int. Cl.
*G06F 15/16* (2006.01)
(52) U.S. Cl. ........................................ 709/230; 709/237
(58) Field of Classification Search .................. 709/230
See application file for complete search history.

(56) References Cited

U.S. PATENT DOCUMENTS

| | | | |
|---|---|---|---|
| 6,236,462 B1 | 5/2001 | Terasaka | |
| 6,804,727 B1 | 10/2004 | Rademacher | |
| 6,898,653 B2 | 5/2005 | Su et al. | |
| 7,213,044 B2 | 5/2007 | Tjong et al. | |
| 7,237,101 B1 | 6/2007 | Dono et al. | |
| 7,668,986 B2 | 2/2010 | Lowe et al. | |
| 2002/0073256 A1 | 6/2002 | Nakamura et al. | |
| 2003/0048473 A1 | 3/2003 | Rosen | |
| 2003/0184784 A1 | 10/2003 | Ferlitsch | |
| 2005/0162675 A1 | 7/2005 | Ferlitsch | |
| 2005/0182822 A1 | 8/2005 | Daniel et al. | |
| 2006/0031632 A1 | 2/2006 | Moran et al. | |
| 2007/0053334 A1* | 3/2007 | Sueyoshi et al. | 370/338 |
| 2007/0079065 A1 | 4/2007 | Bonella et al. | |
| 2007/0299650 A1 | 12/2007 | Tamayo et al. | |
| 2008/0055640 A1 | 3/2008 | Takahashi et al. | |
| 2008/0115071 A1 | 5/2008 | Fair | |
| 2008/0168188 A1 | 7/2008 | Yue et al. | |
| 2008/0195768 A1 | 8/2008 | Lowe et al. | |
| 2008/0276012 A1 | 11/2008 | Mesa et al. | |
| 2010/0023777 A1 | 1/2010 | Prevost et al. | |
| 2010/0146279 A1 | 6/2010 | Lu et al. | |
| 2010/0174834 A1 | 7/2010 | Lowe et al. | |
| 2011/0179204 A1 | 7/2011 | Hulbert et al. | |

OTHER PUBLICATIONS

Johnson, D., Rice Univiersity, Perkins, C., Nokia Research Center, Arkko, J., Ericsson, "Mobility Support in IPv6—rfc3775", Jun. 2004, pp. 1-147.
Kaufman, C., "Internet Key Exchange (IKEv2) Protocol—rfc4306", Dec. 2005, pp. 1-89.
Devarapalli, V., Azaire Networks, Dupont, F., Celar, "Mobile IPv6 Operation with IKEv2 and the REvised IPsec Architecture—rfc4877", Apr. 2007, pp. 1-24.

(Continued)

*Primary Examiner* — Ario Etienne
*Assistant Examiner* — Hee Soo Kim (57) ABSTRACT

A method and apparatus for performing a detach procedure between a first device and a second device. The method includes receiving, at a first device, an informational exchange message to delete an IP security association between the first device and a second device. The informational exchange message further includes a notify message indicating that the deletion of the IP security association is due to a detach request. In response to the notify message indicating that the deletion of the IP security association is due to the detach request, the method further includes automatically deleting, at the first device, a mobility related state associated with the host-based mobility protocol.

12 Claims, 6 Drawing Sheets

OTHER PUBLICATIONS

Muhanna, A., Khalil, M., Nortel, Gundavelli, S., Cisco, Chowdhury, K., Starent Networks, Yegani, P., "Binding Revocation for IPv6 Mobility draft-muhanna-mip6-binding-revocation-02.txt", Nov. 19, 2007, pp. 1-20.

Soliman, Hesham and Elevate Technologies, "Mobile IPv6 support for dual stack Hosts and Routers (DSMIPv6) draft-ietf-mip6-nemo-v4traversal-06.txt", Nov. 2007, pp. 1-27.

U.S. Appl. No. 12/398,508, filed Mar. 5, 2009, Montierth et al., "Maintaining Firmware in a Network Connected Device".

U.S. Appl. No. 12/501,270, filed Jul. 10, 2009, Luttmann et al., Detection of a USP OS Descriptor Request to Facilitate Installation of a Device Driver.

Devarapalli et al., "Mobile IPv6 Operation with IKEV2 and the Revised IPSec Architecture", IETF Trust 2007, Apr. 2007, pp. 1-pp. 24.

Johnson et al., "Mobility Support in IPV6", The Internet Society 2004, Jun. 2004, pp. 1-pp. 147.

Kaufman, "Internet Key Exchange (IKEv2) Protocol", The Internet Society, 2005, Dec. 2005, pp. 1-pp. 89.

Muhanna et al., "Binding Revocation for IPv6 Mobility draft-muhanna-mip6-revocation-02.txt", The IEFT Trust, 2007, Nov. 19, 2007, pp. 1-pp. 20.

Soliman, "Mobile IPv6 Support for dual stack Hosts and Routers (DSMIPv6) draft-ietf-mip6-nemo-v4traversal-06.txt", IETF, Nov. 2007, pp. 1-pp. 27.

\* cited by examiner

DETACH MECHANISMS FOR HOST-BASED MOBILITY PROTOCOLS

CROSS-REFERENCE TO RELATED APPLICATIONS

This disclosure claims the benefit of U.S. Provisional Application No. 61/059,106, filed Jun. 5, 2008.

FIELD

The present disclosure generally relates to wireless networks, and more specifically to host based mobility protocols.

BACKGROUND

Figure 1:
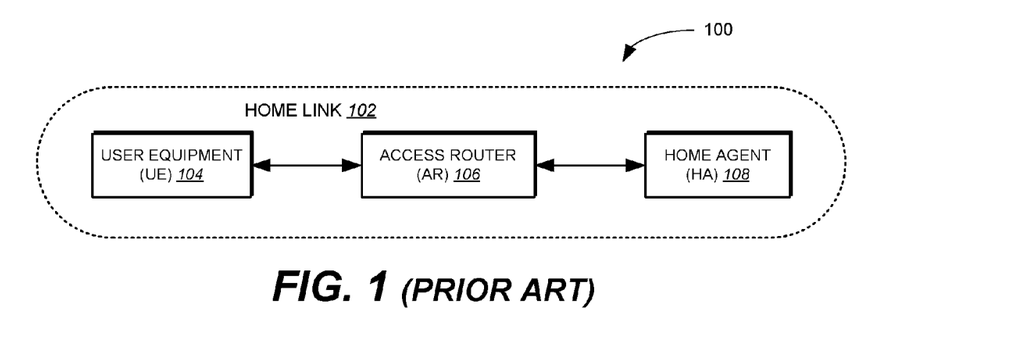
FIG. 1 illustrates a conventional network including a user equipment, access router, and home agent.

In a host-based mobility protocol, e.g., DSMIPv6, a user equipment (UE) (or mobile node) typically extends its Internet Protocol (IP) stack and implements IP mobility signaling as the UE moves and changes its point of attachment. For this reason, DSMIPv6 is often referred as a client MIP (CMIP). FIG. 1 illustrates a conventional network 100 including a user equipment (UE) 104, an access router (AR) 106, and a home agent (HA) 108. As shown in FIG. 1, user equipment 104 is communicating via a home link 102 to a home network.

Figure 2:
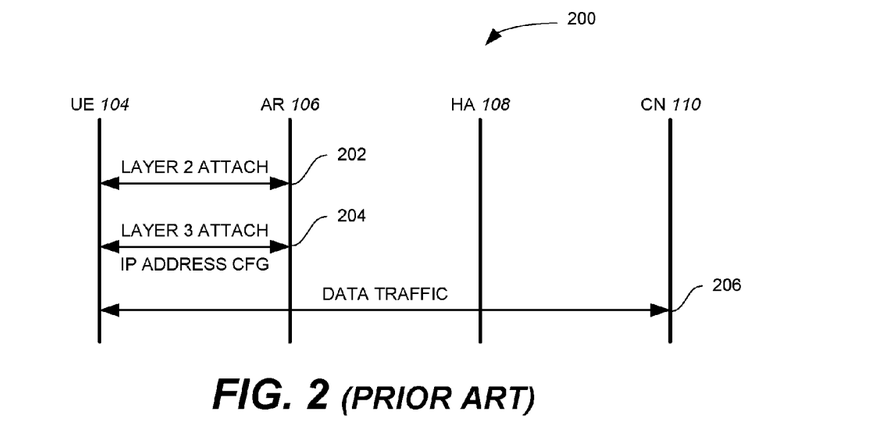
FIG. 2 illustrates a conventional attach procedure.

FIG. 2 illustrates a conventional attach procedure 200 during which user equipment 104 gains network connectivity to a home network via a home link. At step 202, user equipment 104 performs a layer 2 specific attach procedure with access router 106. At step 204, user equipment 104 performs a layer 3 specific procedure to configure an IP address on an interface of user equipment 104. User equipment 104 also performs a home link detection procedure and detects that user equipment 104 is at home and therefore, the IP address previously obtained is a home address associated with user equipment 104. At step 206, user equipment 104 can send and receive data traffic from a correspondent node (CN) 110 via the home address. In general, a correspondent node can be mobile or stationary.

Figure 3:
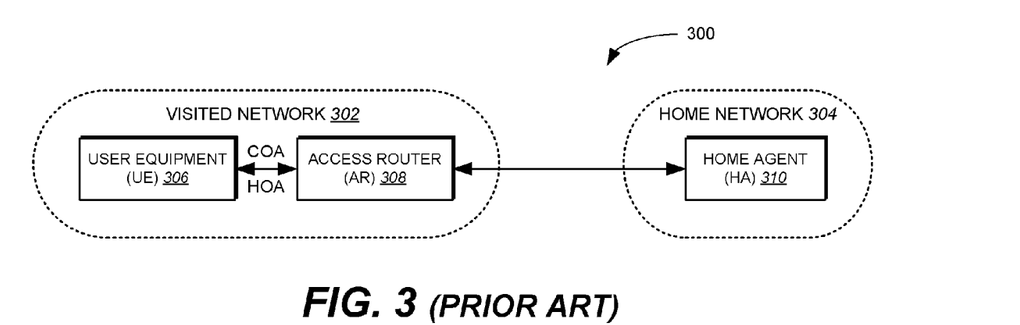
FIG. 3 illustrates a conventional network including a user equipment, access router, and home agent.
Figure 4:
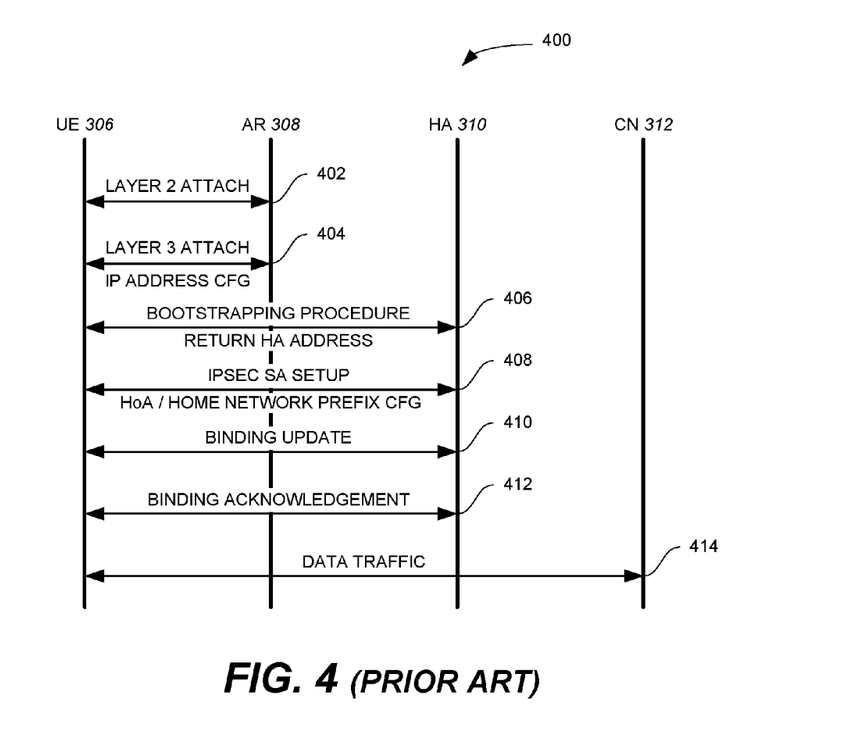
FIG. 4 illustrates a conventional attach procedure.

FIG. 3 illustrates a conventional network 300 including a user equipment (UE) 306, an access router (AR) 308, and a home agent (HA) 310. As shown in FIG. 3, user equipment 306 is connected to a home network 304 via a visited network 302. FIG. 4 illustrates a conventional attach procedure 300 during which a user equipment 306 gains network connectivity to a home network 304 via a foreign link (visited network 302).

Referring to FIG. 4, at step 402, user equipment 306 performs a layer 2 specific attach procedure with access router 308. At step 404, user equipment 306 performs a layer 3 specific procedure to configure an IP address on an interface of user equipment 306. By performing a home link detection procedure, user equipment 306 detects that user equipment 306 is not at home and therefore, the IP address previously obtained is a care-of address (CoA). At step 406, user equipment 306 then starts a bootstrapping procedure to obtain an IP address of home agent 310, if not available, using either DHCP or DNS. At step 408, user equipment 306 runs an IKEv2 protocol with home agent 310 to establish an IPSec security association. User equipment 306 can also obtain a home address (HoA) and a home network prefix during this procedure. At step 410, user equipment 306 registers the binding between the care-of address and the home address in a Binding Update message with home agent 310. Upon receiving this Binding Update message, home agent 310 creates a binding between the care-of address and the home address in a Binding Cache entry. At step 412, a Binding Acknowledgement message, if requested, is sent back from home agent 310 to notify user equipment 306 of the status of the Binding Update procedure. At step 414, user equipment 306 gains network connectivity and can send or receive data traffic from a correspondent node (CN) 312 at the current point of attachment.

In order to enable mobility service, both a UE and a home agent needs to allocate resources and maintain states. For example, a home agent needs to create a Binding Cache entry (if the UE attaches to a foreign link), establish and maintain an IPSec SA (if the UE attaches to a foreign link) and allocate a home address for the UE. On the other hand, the UE needs to create a Binding Update List entry, and establish and maintain an IPSec SA for each home agent that the UE connects to. The HA may have to discontinue IP mobility service provided to the UE sometimes, for example when a prepaid account associated with the UE contains insufficient funds or due to administration reasons. In this case, a home agent should remove related states and withdraw allocated resources, and also allow the UE to do so gracefully. Such a procedure is referred to as a network-initiated detach procedure. On the other hand, it is possible that a UE may decide to stop using mobility service at certain point of time. In such a case, a UE needs to remove allocated resources and also inform a HA to do so. This procedure is referred to as a UE-initiated detach procedure.

As specified in RFC 3775, "Mobile Support in IPv6", each Binding Cache entry is associated with a lifetime. Therefore, when an HA decides to detach a UE from a home network, the HA may reject the request of binding renewal from the UE. In this way, the UE cannot update its binding and thus the UE cannot continue using mobility services. However, one obvious drawback of this mechanism is that the HA has to wait until the binding expires before the HA can withdraw and re-use resources allocated for the UE. Another approach is that the HA implicitly detaches the UE from the network without notifying the UE. However, this approach is not user-friendly.

Draft-muhanna-mip6-binding-revocation-02, "Binding Revocation for IPv6 Mobility", proposes an approach to enable an HA to immediately revoke a binding of a UE. However, the draft does not specify how to withdraw other resources, such as the IPSec SA and the home address, and only discloses removal of the binding between a care-of address and a home address of a UE. A home address is usually assigned by an HA to a UE dynamically during the procedure of establishing an IPSec SA. The IKEv2 protocol allows either the HA or the UE to initiate the procedure to delete a pre-established IPSec SA; however, the IKEv2 protocol does not provide any indication on why an IPSec security association needs to be deleted or whether the UE needs to detach from the home network.

SUMMARY

In general, in one aspect, this specification describes a method and apparatus for performing a detach procedure between a first device and a second device, in which the first device and the second device communicate in accordance with a host-based mobility protocol. The method includes receiving, at the first device, an informational exchange message to delete an IP security association between the first device and a second device. The informational exchange message further includes a notify message indicating that the deletion of the IP security association is due to a detach request. In response to the notify message indicating that the deletion of the IP security association is due to the detach request, the method further includes automatically deleting, at the first device, a mobility related state associated with the host-based mobility protocol.

With such a mechanism, only one message needs to be exchanged in order to perform detach specific operations, such as deleting the IPSec SA and mobility related states as well as withdrawing an allocated home address. Therefore, message overhead during detach procedure is substantially reduced.

BRIEF DESCRIPTION OF THE DRAWINGS

Like reference symbols in the various drawings indicate like elements.

DETAILED DESCRIPTION

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. In general, steps within a method may be executed in different order without altering the principles of the present disclosure.

Figure 5:
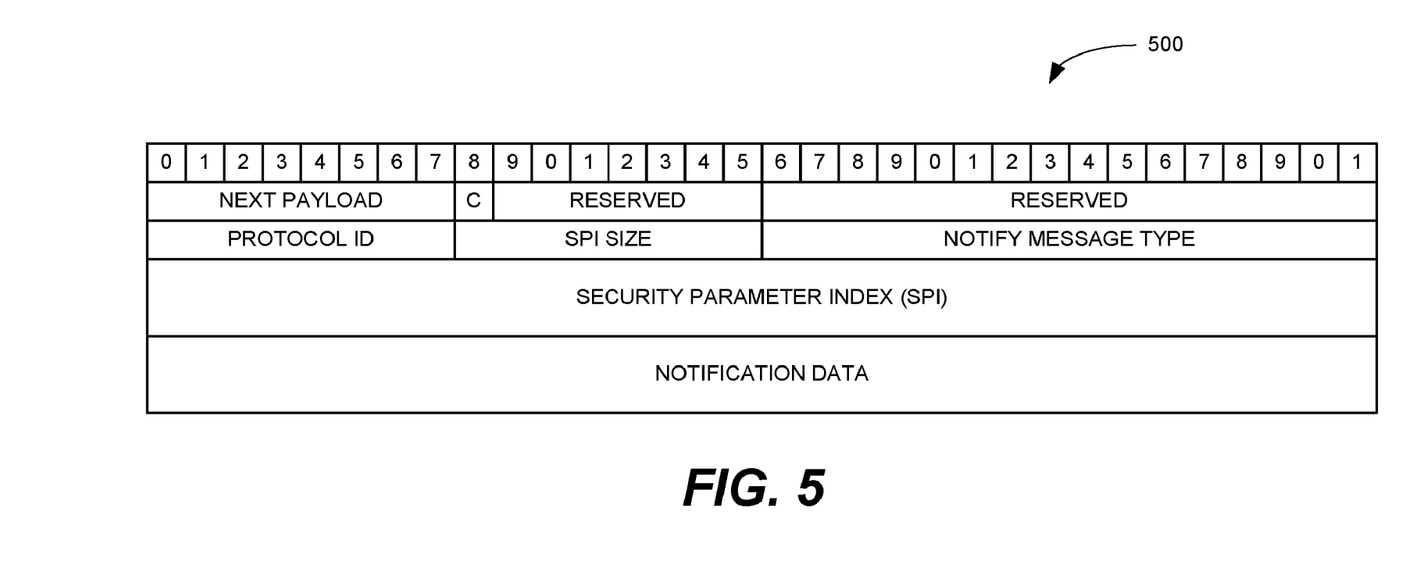
FIG. 5 illustrates an example notification (NOTIFY) message.

In this disclosure, a new type of NOTIFY message is described that, in one implementation, is used during an informational exchange for one IPSec end point to indicate to the other IPSec end point the reason of the deletion of a specific IPSec SA (usually the one used to protect mobility signaling), i.e. due to the detach decision in this case. FIG. 5 illustrates an example format of a NOTIFY message 500. NOTIFY message 500 includes the following fields: "next payload", "c", "reserved", "protocol ID", "security parameter index (SPI) size", "notify message type", "security parameter index (SPI)", and "notification data".

One implementation of use of this new type of NOTIFY message can be described as follows. Upon reception of the delete payload together with the Notify payload carrying this new NOTIFY message from one end point (p1), the other end point (p2) shall delete mobility related states, for example, the binding between the care-of address and the home address, and then delete the requested IPSec SA as well. After finishing such operations, the other end point (p2) shall send back to the end point (p1) initiating the request of deleting the IPSec SA an IKEv2 response message that contains the delete payload for the IPSec SA on the other direction and the Notify payload carrying this new type of NOTIFY message to indicate that this is due to detach. The end point (p1) initiating the deletion of the IPSec SA then deletes corresponding mobility binding and the requested IPSec SA. In one implementation, both a home agent and a UE generates and includes such a NOTIFY message in an IKEv2 informational exchange.

Figure 6:
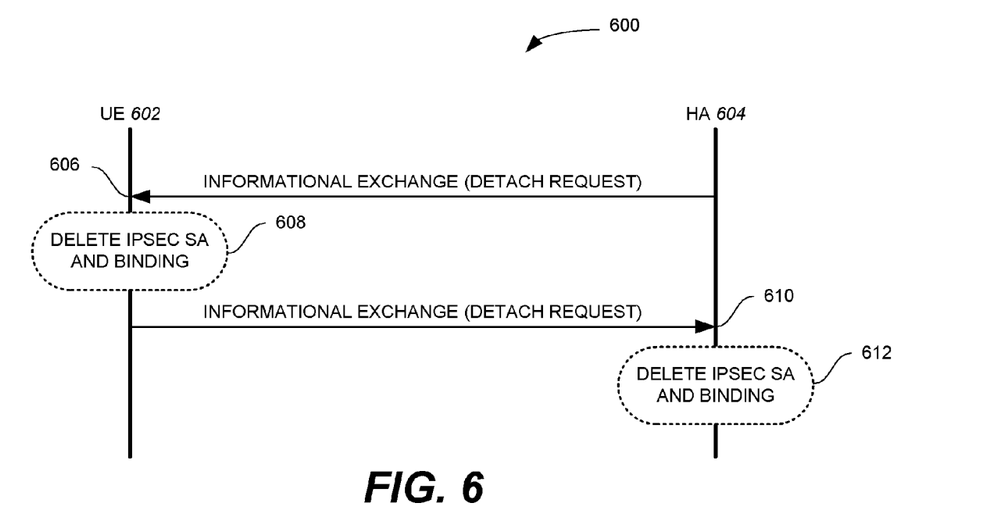
FIG. 6 illustrates an example network-initiated detach procedure in accordance with one implementation of the invention.

FIG. 6 illustrates a network-initiated detach procedure 600 using a NOTIFY message in accordance with one implementation. At step 606, a home agent 604 receives a decision to detach a UE 602 from network entities, such as AAA (authentication, authorization and accounting) server or HSS (home subscriber server). Home agent 604 sends an IKEv2 informational exchange message carrying a Delete payload (to indicate which IPSec SA to be deleted on the UE side) and the new NOTIFY payload (to indicate that the deletion of the IPSec SA is due to detach) to UE 602. At step 608, when the UE receives such a message, since the new NOTIFY payload indicates the reason for deleting the IPSec SA is because of detach, UE 602 deletes corresponding mobility related states, such as the corresponding Binding Update List entry; furthermore, UE 602 shall stop using the home address allocated during the IPSec SA establishment. UE 602 also deletes the requested IPSec SA as specified in the IKEv2 protocol.

At step 610, as a response to the received informational exchange message from home agent 604, UE 602 replies with an informational exchange message which carries a Delete payload (to indicate which IPSec SA to be deleted on the home agent side) and the new NOTIFY payload (to indicate that the deletion of the IPSec SA is due to detach) to home agent 604. At step 612, when home agent 604 receives such a reply, since the new NOTIFY payload indicates the reason for deleting the IPSec SA is because of detach, home agent 604 deletes corresponding mobility related states, such as the Binding Cache entry; furthermore, home agent 604 may place the home address allocated to UE 602 during the IPSec SA establishment procedure back into a pool for later re-use. Home agent 604 also deletes the IPSec SA as specified in the IKEv2 protocol.

Figure 7:
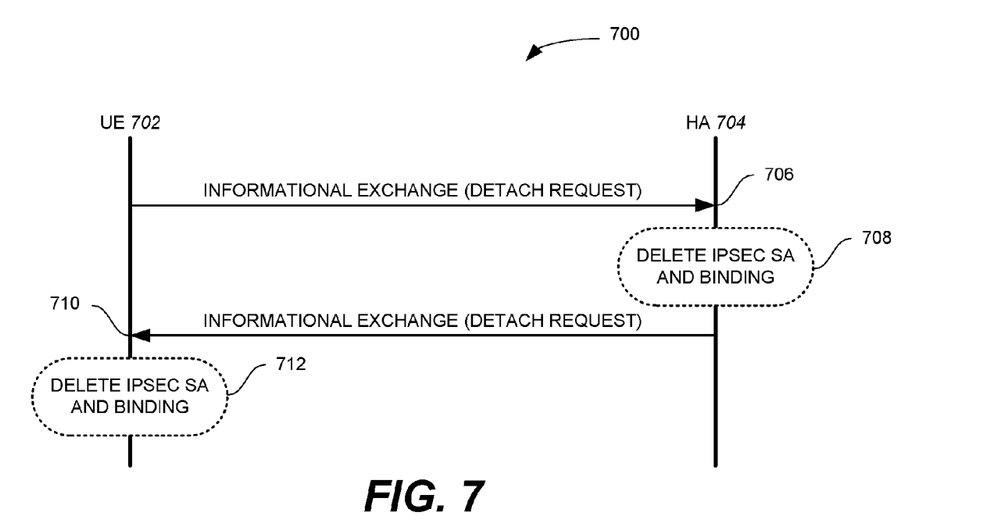
FIG. 7 illustrates an example UE-initiated detach procedure in accordance with one implementation of the invention.

FIG. 7 illustrates a UE-initiated detach procedure 700 using a NOTIFY message in accordance with one implementation. In a UE-initiated detach, a UE indicates that the deletion of the IPSec SA (used for mobility signaling protection) is due to a detach decision by including a NOTIFY payload and a DELETE payload in an IKEv2 Informational exchange message. In the example of FIG. 7, a UE 702 decides to detach from a home network. Therefore, at step 706, UE 702 sends an IKEv2 informational exchange message carrying a Delete payload (to indicate which IPSec SA to be deleted on the home agent side) and the new NOTIFY payload (to indicate that the deletion of the IPSec SA is due to detach) to a home agent 704. At step 708, when home agent 704 receives the message, since the new NOTIFY payload indicates the reason for deleting the IPSec SA is because of detach, home agent 704 deletes corresponding mobility related states, such as the Binding Cache entry; furthermore, home agent 704 may place the home address allocated to UE 702 during the IPSec SA establishment procedure back into a pool for later re-use. Home agent 704 also deletes the IPSec SA as specified in the IKEv2 protocol.

At step 710, as a response to the received informational exchange message from UE 702, home agent 704 replies with an informational exchange message which carries the Delete payload (to indicate which IPSec SA to be deleted on the UE side) and the new NOTIFY payload (to indicate that the deletion of the IPSec SA is due to detach) to UE 702. At step 712, when UE 702 receives such a reply, since the new NOTIFY payload indicates the reason for deleting the IPSec SA is because of detach, UE 702 deletes corresponding mobility related states, such as the corresponding Binding Update List entry; furthermore, UE 702 shall stop using the home address allocated during the IPSec SA establishment. UE 702 also deletes the requested IPSec SA as specified in the IKEv2 protocol.

Figure 8:
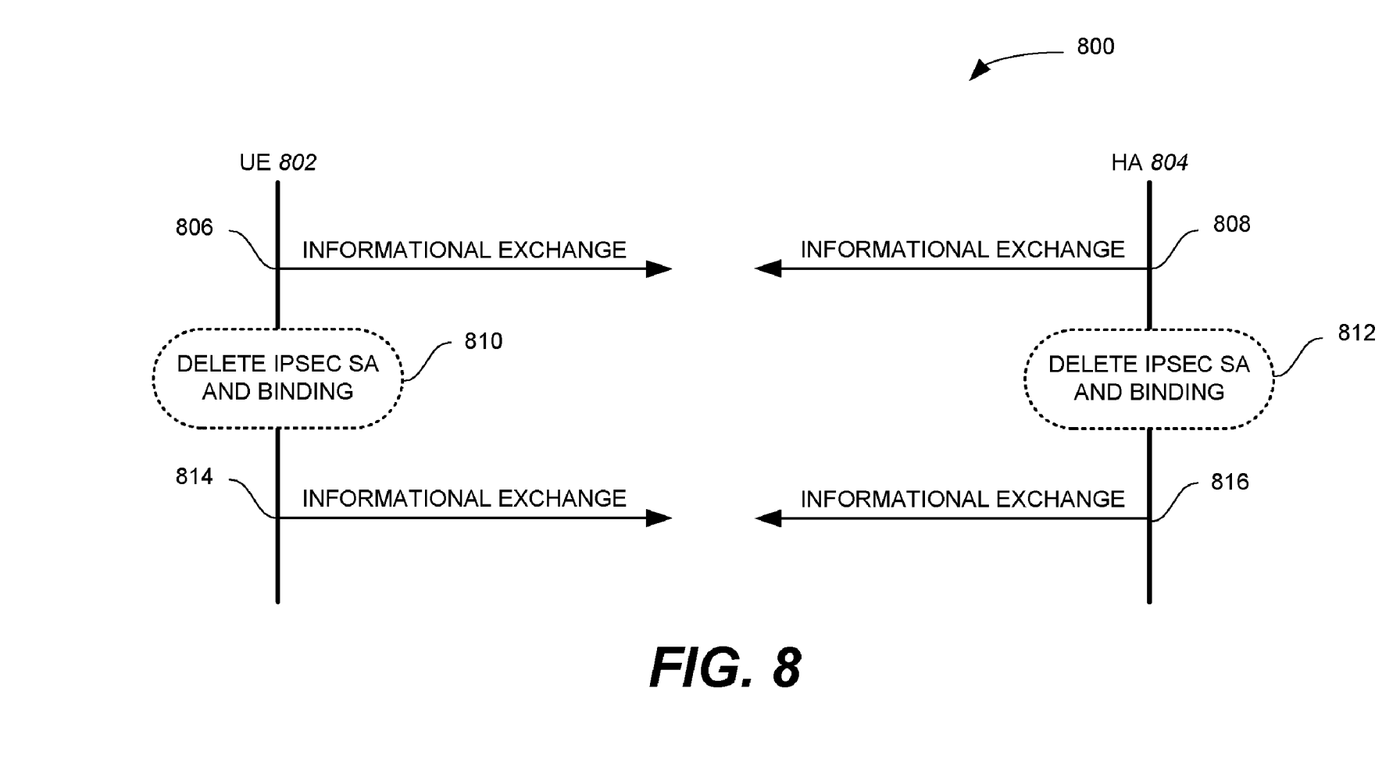
FIG. 8 illustrates an example detach procedure in accordance with one implementation of the invention.

FIG. 8 illustrates a detach procedure 800 simultaneously initiated by both a UE 802 and a home agent 804. Since UE 802 and home agent 804 can make detach decision independently, it is possible that UE 802 and home agent 804 may simultaneously initiate a detach procedure by sending an IKEv2 informational exchange messages to each other (represented by steps 806, 808 in FIG. 8). The IKEv2 informational exchange message carries a Delete payload (to indicate which IPSec SA to be deleted on the peer's side) and a NOTIFY payload (to indicate that the deletion of the IPSec SA is due to detach).

At step 812, when home agent 804 receives such a message, since the new NOTIFY payload indicates the reason for deleting the IPSec SA is because of detach, home agent 804 shall delete corresponding mobility related states, such as the Binding Cache entry; furthermore, home agent 804 may place the home address allocated to the UE during the IPSec SA establishment procedure back into a pool for later re-use. Home agent 804 also deletes the IPSec SA as specified in the IKEv2 protocol. At step 810, when UE 802 receives such a message, since the NOTIFY payload indicates the reason for deleting the IPSec SA is because of detach, UE 802 shall delete corresponding mobility related states, such as the corresponding Binding Update List entry; furthermore, UE 802 shall stop using the home address allocated during the IPSec SA establishment. UE 802 also deletes the requested IPSec SA as specified in the IKEv2 protocol. As a response to the received informational exchange message, both UE 802 and home agent 804 will send an informational exchange message to their peer (represented by steps 814, 816). However, since both UE 802 and home agent 804 know that they have both previously requested the deletion of the IPSec SA on its peer's side and each have already received a request of deleting the IPSec SA from its peer, in order not to trigger deletion again, (in one implementation) UE 802 and home agent 804 does not include any Delete payload and/or the new NOTIFY payload in the replied informational exchange message.

One or more of the method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 9:
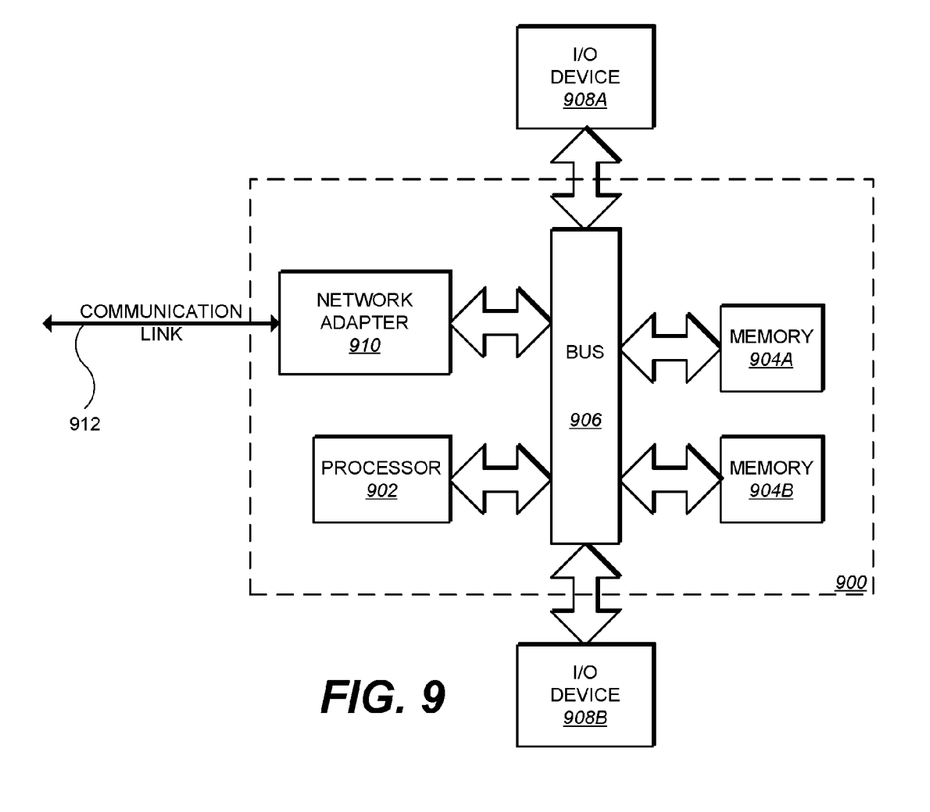
FIG. 9 is a block diagram of a data processing system suitable for storing and/or executing program code in accordance with one implementation of the invention.

FIG. 9 illustrates a data processing system 900 suitable for storing and/or executing program code. Data processing system 900 includes a processor 902 coupled to memory elements 904A-B through a system bus 906. In other implementations, data processing system 900 may include more than one processor and each processor may be coupled directly or indirectly to one or more memory elements through a system bus. Memory elements 904A-B can include local memory employed during actual execution of the program code, bulk storage, and cache memories that provide temporary storage of at least some program code in order to reduce the number of times the code must be retrieved from bulk storage during execution. As shown, input/output or I/O devices 908A-B (including, but not limited to, keyboards, displays, pointing devices, etc.) are coupled to data processing system 900. I/O devices 908A-B may be coupled to data processing system 900 directly or indirectly through intervening I/O controllers (not shown).

In one implementation, a network adapter 910 is coupled to data processing system 900 to enable data processing system 900 to become coupled to other data processing systems or remote printers or storage devices through communication link 912. Communication link 912 can be a private or public network. Modems, cable modems, and Ethernet cards are just a few of the currently available types of network adapters.

What is claimed is:

1. A method for performing a detach procedure between a first device and a second device, the first device and the second device communicating in accordance with a host-based mobility protocol, the method comprising:
   receiving, at the first device, from the second device an informational exchange message to delete an IP security association between the first device and the second device, the informational exchange message further including a notify message indicating that the deletion of the IP security association is due to a detach request;
   in response to the notify message, automatically deleting, at the first device, (i) a mobility related state associated with the host-based mobility protocol and (ii) the IP security association between the first device and the second device, wherein the automatically deleting the mobility related state includes deleting a binding between a care-of address of the second device and a home address of the second device; and
   subsequent to the automatically deleting the mobility related state, transmitting, by the first device to the second device, a response message that includes a delete payload for the IP security association.

2. The method of claim 1, wherein the mobility related state corresponds to a binding cache entry.

3. The method of claim 2, wherein the binding cache entry comprises a care of address and a home address.

4. The method of claim 1, wherein the first device comprises a user equipment and the second device comprises a home agent.

5. The method of claim 1, wherein notify message is in an IKEv2 informational exchange message.

6. The method of claim 1, wherein the response message is a IKEv2 response message.

7. The method of claim 1, further comprising withdrawing an allocated home address of the second device.

8. A non-transitory processor readable medium storing processor readable instruction for performing a detach procedure between a first device and a second device that are configured to communicate in accordance with a host-based mobility protocol, the procedure including:
- receiving, at the first device from the second device, an informational exchange message requesting deletion of an IP security association between the first device and the second device, wherein the informational exchange message includes a notify message indicating that the requested deletion is based on a detach request;
- in response to the notify message indicating that the deletion of the IP security association is due to the detach request, automatically deleting, at the first device, (i) a mobility related state associated with the host-based mobility protocol and (ii) the IP security association between the first device and the second device, wherein the automatically deleting the mobility related state includes deleting a binding between a care-of address of the second device and a home address of the second device; and
- subsequent to the automatically deleting the mobility related state, transmitting, by the first device to the second device, a response message that includes a delete payload for the IP security association.

9. The non-transitory processor readable medium of claim 8, wherein the informational exchange message and the response message are IKEv2 messages.

10. The non-transitory processor readable medium of claim 8, wherein the procedure further comprises withdrawing an allocated home address of the second device.

11. A device for communicating with a remote device in accordance with a host-based mobility protocol, the device comprising:
- a network adapter configured to receive an informational exchange message requesting deletion an IP security association between the device and the remote device, wherein the informational exchange message includes a notify message indicating that the requested deletion is based on a detach request;
- a memory; and
- a processor configured to, in response to the notify message, automatically delete (i) a mobility related state associated with the host-based mobility protocol from the memory and (ii) the IP security association between the device and the remote device, wherein the processor is configured to automatically delete the mobility related state by deleting a binding between a care-of address of the second device and a home address of the remote device,
- wherein the network adapter is further configured to, subsequent to the automatically deleting the mobility related state, transmit to the remote device a response message that includes a delete payload for the IP security association.

12. The device of claim 11, wherein the informational exchange message and the response message are IKEv2 messages.

* * * * *